US010963559B1

(12) United States Patent
Lee

(10) Patent No.: US 10,963,559 B1
(45) Date of Patent: Mar. 30, 2021

(54) SMART PROPERTY ARCHIVE FOR SAFEGUARDING SOFTWARE CONFIGURATION

(71) Applicant: Hon Kong Kenneth Lee, Hong Kong (HK)

(72) Inventor: Hon Kong Kenneth Lee, Hong Kong (HK)

( * ) Notice: Subject to any disclaimer, the term of this patent is extended or adjusted under 35 U.S.C. 154(b) by 181 days.

(21) Appl. No.: 16/367,265

(22) Filed: Mar. 28, 2019

(51) Int. Cl.
  *G06F 21/54* (2013.01)
(52) U.S. Cl.
  CPC ........ *G06F 21/54* (2013.01); *G06F 2221/033* (2013.01)
(58) Field of Classification Search
  CPC .. G06F 21/54; G06F 2221/033; G06F 21/602; G06F 21/52; H04L 63/062; H04L 9/0819; H04L 9/083
  See application file for complete search history.

Primary Examiner — Paul E Callahan

(57) ABSTRACT

A masked property file system receives a property key from a programmer and retrieves property key-value pairs. For each property key-value pair, the masked property file system identifies a masked value based on property files associated with the property key-value pair. For each property key-value pair, the masked property file system associates an environment for the masked value corresponding to the property key-value pair. For each property key-value pair, the masked property file system identifies an executable code for the masked value associated with the environment associated with each property key-value pair and generates a callback within the property key-value pair comprising the executable code. The masked property file system presents the property key-value pairs comprising the callbacks to the programmer. The programmer selects a callback of a property key-value pair and tire user computing device web browser is redirected to a property file service where the programmer may unmask the masked value corresponding to the executable code.

10 Claims, 5 Drawing Sheets

SMART PROPERTY ARCHIVE FOR SAFEGUARDING SOFTWARE CONFIGURATION

FIELD OF THE INVENTION

The present disclosure relates to improving configuration controls in software engineering compliance by providing a direct executable code to unmasking a masked value in a property key-value pair.

BACKGROUND OF THE INVENTION

Hard-coding configuration conflates configuration and code. This may cause much pain in software engineering, as the application and infrastructure grow this anti-pattern will make configuration increasingly complex and error prone. Configuration varies substantially across deploys.

There is also security implication in addition to simple inconvenience and complexity. Knowing the secret token allows an attacker to trivially impersonate any programmer in the application. The only system that needs to know the production secret token is the production infrastructure, which is likely to be the most secure part of the infrastructure, thus it is not unreasonable to limit attack vector to the production infrastructure. Nevertheless, hardcoding the production secret token in the code base has the consequence of opening additional undesirable attack vectors:

Every developer that has had access to the code base.
Every development workstation that has a local copy of the code.
The source control repository.
The continuous integration server The types of potential threats to application security include compromising administrative access to applications, session forgery, and remote code execution (RCE). The result of the anti-pattern can potentially compromise the confidentiality, integrity or availability properties of resources.

SUMMARY OF THE INVENTION

A Smart property file for safeguarding software configuration. Property files containing masked values are unmasked by using property plaintext secrets at application runtime. A first service secret is used to encrypt a property plaintext secret to obtain a first property ciphertext secret, wherein both the first service secret and the first property ciphertext secret are specific to a first environment. By segregating secrets among different environments, sensitive property values in the first environment are better protected from possible attacks by a second environment.

Programmer access to updating a service secret is restricted, wherein the only access way is by using an authorized portable device. The authorized portable device updates the first service secret, and in turn uses the first service secret to update all associated property ciphertext secrets in the first environment without updating any of the first property plaintext secrets and their associated masked property values, wherein the authorized portable device carries out the various updates in one atomic transaction.

By segregating programmer access to environment-specific service secrets (and property ciphertext secrets) from managerial access to application-specific property values, software development benefits from enhanced productivity without compromising security and manageability. Programmers are encouraged not to think of software configurations as hierarchical (top-down, functionally decomposed) components, but rather in terms of a flat set of interchangeable components.

Techniques herein provide computer-implemented methods to provide property key-value pairs comprising executable codes for masked property values associated with the property key-value pairs are provided. By using and relying on the methods and systems described herein, the masked property file system provides the programmer with an executable code for an item associated with a property key-value pair in a property key-value pair in response to receiving a property key. Runtime configuration properties, such as database passwords, are masked to restrict access from programmers during application development, and are automatically unmasked during execution of an application runnable in environments. A typical software development workflow include example environments such as Lab, QA, UAT, Staging, Integration, and Production.

A masked property file system receives a property query from a programmer and retrieves property key-value pairs based on the property query. For each property key-value pair, the masked property file system identifies a masked value based on property files associated with the property key-value pair. For each property key-value pair, the masked property file system associates an environment for the masked value corresponding to the property key-value pair based on comparing property files associated with the property key-value pair to service secrets associated with environments. For each property key-value pair, the masked property file system identifies an executable code for the masked value associated with the environment associated with each property key-value pair and generates a callback within the property key-value pair comprising the executable code. The masked property file system presents the property key-value pairs comprising the callbacks to the programmer in response to the programmer's property query. The programmer selects, via the user computing device, a callback of a property key-value pair and the user computing device web browser is redirected to a property file service where the programmer may unmask the masked value corresponding with the executable code. In certain other example aspects described herein, systems and computer program masked values to provide property key-value pairs comprising executable codes for masked values associated with the property key-value pairs are provided.

A better understanding of the disclosed technology will be obtained from the following brief description of drawings illustrating exemplary embodiments of the disclosed technology.

A better understanding of the disclosed technology will be obtained from the following detailed description of embodiments of the disclosed technology, taken in conjunction with the drawings.

DETAILED DESCRIPTION

Figure 1:
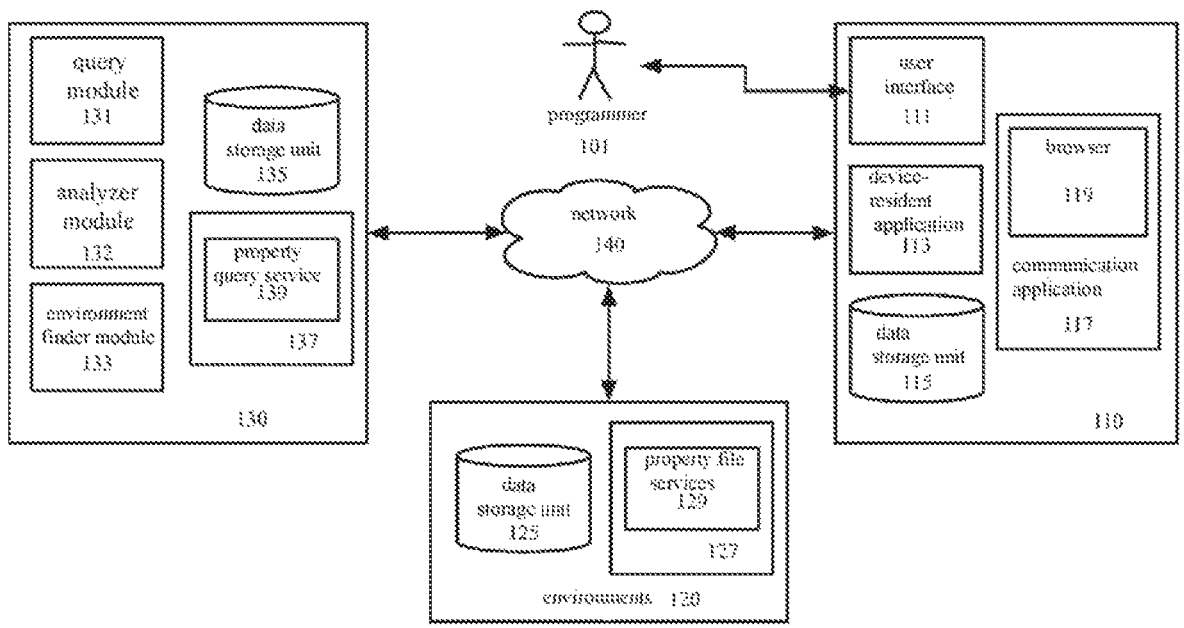
FIG. 1 is a block diagram depicting a system for providing property key-value pairs comprising executable codes for masked values associated with the property keys, in accordance with certain example embodiments.

FIG. 1 is a block diagram depicting a system 100 for providing property key-value pairs comprising unmasking executable codes for masked values associated with the property keys, in accordance with certain example embodiments. As depicted in FIG. 1, the system 100 includes network computing devices 110, 120, and 130 that are configured to communicate with one another via one or more networks 140. In some embodiments, a programmer associated with a device must install an application and/or make a property selection to obtain the benefits of the techniques described herein.

Each network computing device 110, 120, and 130 includes a device having a communication module capable of transmitting and receiving data over the network 140. For example, each network computing device 110, 120, and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, and 130 are operated by programmers 101, environment 120 operators, and masked property file system 130 operators, respectively.

An example user computing device 110 comprises a user interface 111, a device-resident application 113, a data storage unit 115, a communication application 117, and a web browser 119.

In an example embodiment, the user interface 111 enables the programmer 101 to access a property query service 139 and enter a property key. In an example embodiment, the programmer 101 selects a callback associated with a property key-value pair via the user interface 111. In an example embodiment, the programmer 101 enters runnable information and/or user information to a property file service 129 to use in an unmasking transaction for unmasking a masked value corresponding with a property key-value pair via the user interface 111. In an example embodiment, the programmer 101 selects an option to confirm the unmasking transaction with the property file service 129 via the user interface 111.

In certain example embodiments described herein, one or more functions performed by the device-resident application 113 resident on the user computing device 110 may also be performed by a web browser 119 associated with the masked property file system 130. In certain example embodiments described herein, one or more functions performed by the masked property file system 130 may also be performed by the device-resident application 113. In certain example embodiments described herein, one or more functions performed by the web browser 119 associated with the masked property file system 130 may also be performed by the device-resident application 113.

In an example embodiment, the data storage unit 115 comprises a local or remote data storage structure accessible to the user computing device 110 suitable for storing information. In an example embodiment, the data storage unit 115 stores encrypted information, such as HTML5 local storage.

In an example embodiment, the communication application 119 can interact with web servers or other computing devices connected to the network 140, including the user computing device 110 and a web server 127 of an environment 120.

In an example embodiment, the web browser 119 can enable the programmer 101 to interact with web services using the user computing device 110. In an example embodiment, the masked property file system 130 instructs the user computing device 110 to direct the web browser 119 to redirect to a property file service 139 unmasking a masked value in response to receiving, from the user computing device 110, an indication of the selection by the programmer 101 of a callback corresponding to a property key-value pair depicting the masked value.

An example environment 120 comprises a data storage unit 125, a server 127, and a property file service 129. An example data storage unit 125 comprises a local or remote data storage structure accessible to the environment 120 suitable for storing information. In an example embodiment, the data storage unit 125 stores encrypted information, such as HTML5 local storage. An example masked property file system 130 comprises a query module 131, a key-value pair analyzer module 132, an environment finder module 133, a data storage unit 135, a server 137, and a property query service 139.

In an example embodiment, the query module 131 receives a programmer's 101 property key from a user computing device 110 associated with the programmer 101. In an example embodiment, the query module 131 retrieves one or more property key-value pairs based on the property key. In an example embodiment, the query module 131 communicates with the key-value pair analyzer module 132 and/or the environment finder module 133. For example, the query module 131 communicates with the key-value pair analyzer module 132 to determine one or more query elements of a property key-value pair, which the query module 131 compares against one or more corresponding elements of other property key-value pairs to determine a masked value depicted by a property key-value pair. In an example, the query module 131 communicates with the environment finder module 133 to retrieve one or more environments corresponding to a masked value depicted in a property key-value pair. In an example embodiment, the query module 131 generates a callback comprising an unmasking executable code for the selected environment. In an example embodiment, the query module 131 transmits one or more property key-value pairs comprising corresponding callbacks to the user computing device 110 for rendering to the programmer 101. In an example embodiment, the query module 131 receives an indication of a programmer 101 selection of a callback from the user computing device 110. In an example embodiment, the query module 131 transmits instructions to the user computing device 110 to redirect the web browser 119 of the user computing device 110 to a property file service 129 associated with the unmasking executable code corresponding to the selected callback.

In an example embodiment, the key-value pair analyzer module 132 determines one or more query elements of a property key-value pair. In an example embodiment, the key-value pair analyzer module 132 determines the closest property key in the database to the property key-value pair based on the comparison of the elements of the property keys and transmits the key-value pair to the query module 131, which determines the masked value depicted by the property key.

In an example embodiment, the environment finder module 133 receives a request from the query module 131 to find one or more environments associated with a masked value identified in a property key-value pair. In an example embodiment, the environment finder module 133 accesses a masked value environment list catalog to retrieve one or more environments associated with the identified masked value. In an example embodiment, the environment finder module 133 selects an environment from the one or more retrieved environments to present to the programmer 101. In this example embodiment, the environment finder module 133 determines an unmasking executable code for the selected environment. In an example embodiment, the environment finder module 133 communicates the selected environment associated with the particular property key-value pair and the corresponding unmasking executable code to the query module 131.

In an example embodiment, the data storage unit 135 comprises a local or remote data storage structure accessible to the masked property file system 130 suitable for storing information. In an example embodiment, the data storage unit 135 stores encrypted information, such as HTML5 local storage. In an example embodiment, the data storage unit 135 comprises a masked value environment listing catalog comprising a list of masked values and one or more environments associated with each masked value listing.

In an example embodiment, the property query service 139 is a means by which the programmer 101 interacts with the masked property file system 130. In an example embodiment, the programmer 101 may enter a property key and receive property key-value pairs comprising callbacks via the property query service 139. In an example embodiment, the programmer 101 accesses the property query service 139 via the web browser 119 of the user computing device 110. In another example embodiment, the programmer 101 accesses the property query service 139 via the device-resident application 113 resident on the user computing device 110.

Figure 2:
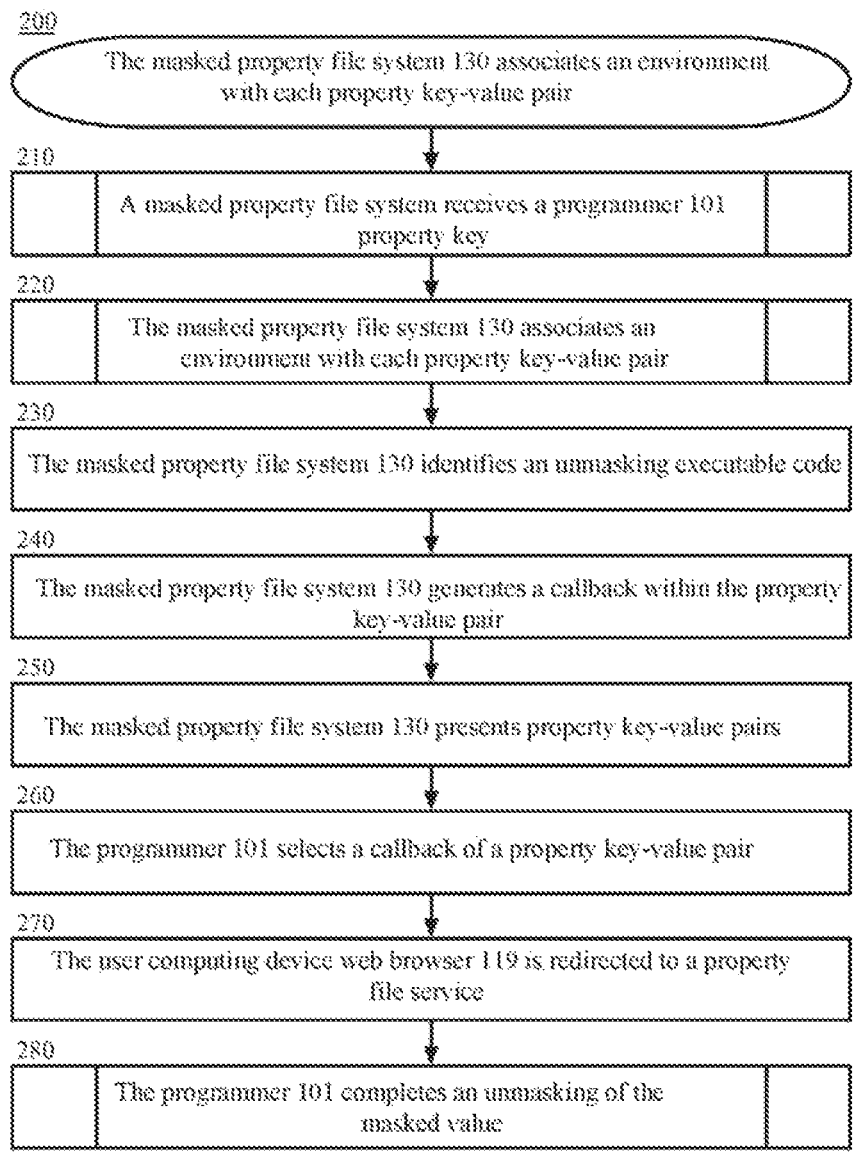
FIG. 2 is a block flow diagram depicting a method for providing property key-value pairs comprising executable codes for masked values associated with the property keys, in accordance with certain example embodiments.
Figure 3:
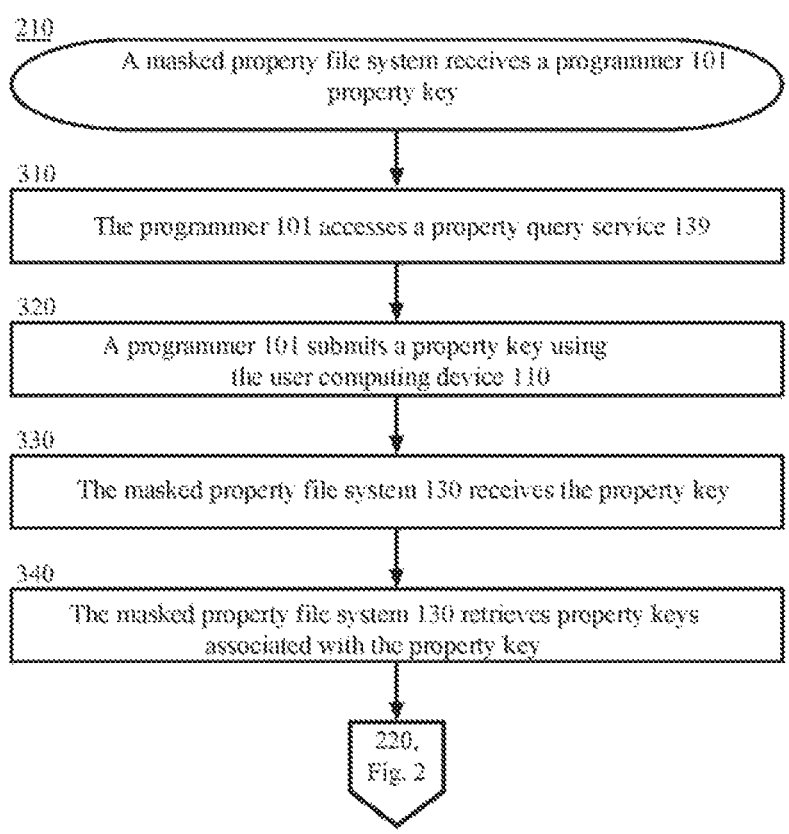
FIG. 3 is a block flow diagram depicting a method for retrieving property key-value pairs in response to receiving a user property key, in accordance with certain example embodiments.

FIG. 2 is a block diagram depicting a method 200 for providing property key-value pairs comprising unmasking executable codes for masked values associated with the property keys, in accordance with certain example embodiments. The method 200 is described with reference to the components illustrated in FIG. 1. In block 210, a masked property file system receives a programmer 101 property key and retrieves property key-value pairs. FIG. 3 is a block diagram depicting a method 210 for retrieving property key-value pairs in response to receiving a user property query, in accordance with certain example embodiments. The method 210 is described with reference to the components illustrated in FIG. 1.

In block 310, the programmer 101 accesses a property query service 139. In an example embodiment, the programmer 101 enters, via the user interface 111, the property query service address associated with the property query service 139 into the user computing device web browser 119 and accesses the property query service 139 via the network 140. In another example embodiment, the programmer 101 is viewing a property query service other than the property query service 139 in the web browser 119 and clicks an executable code on the other property query service, which redirects the web browser 119 to the property query service 139. In yet another example embodiment, the programmer 101 accesses the property query service 139 and downloads a device-resident application 113 onto the user computing device 110 over the network 140. In this example embodiment, the device-resident application 113 resident on the user computing device 110 communicates with the property query service 139 over the network 140 to enable the programmer 101 to access the property query service 139 via the device-resident application 113. For example, the programmer 101 selects the device-resident application 113 on the user computing device 110 to access the property query service 139.

In block 320, a programmer 101 submits a property key using the user computing device 110. In an example embodiment, the programmer 101 submits a property key to the property query service 139 via the device-resident application 113 or via the web browser 119. In an example embodiment, the programmer 101 may actuate one or more user interface 111 objects to direct the device-resident application 113 or the web browser 119 to submit the property key to the property query service 139 over the network 140.

In block 330, the masked property file system 130 receives the property key. For example, the property query service 139 receives the property key via the network 140 from the device-resident application 113 or the web browser 119 resident on the user computing device 110.

In block 340, the masked property file system 130 retrieves property keys associated with the property key. In an example embodiment, the masked property file system 130 parses the received property key into one or more query elements or otherwise determines one or more query elements based on the received property key. For example, the programmer 101 submits a property key comprising text reading "config.sales.backend.password" In this example, the masked property file system 130 may interpret the property key as comprising query elements "config," "app_config" and "backend_password".

Continuing with this example, the property key-value pair of the sales department radius is more compatible than a property key-value pair of a marketing department radius or a sales department database with the aforementioned query elements. In an example embodiment, the masked property file system 130 may determine a compatibility of each of the retrieved property key-value pairs by comparing information associated with the property key-value pairs against the one or more query elements. For example, the masked property file system 130 may comprise a database comprising property key-value pairs, wherein each property key-value pair is associated with one or more text descriptors.

From block 340, the method 210 proceeds to block 220 of FIG. 2.

Figure 4:
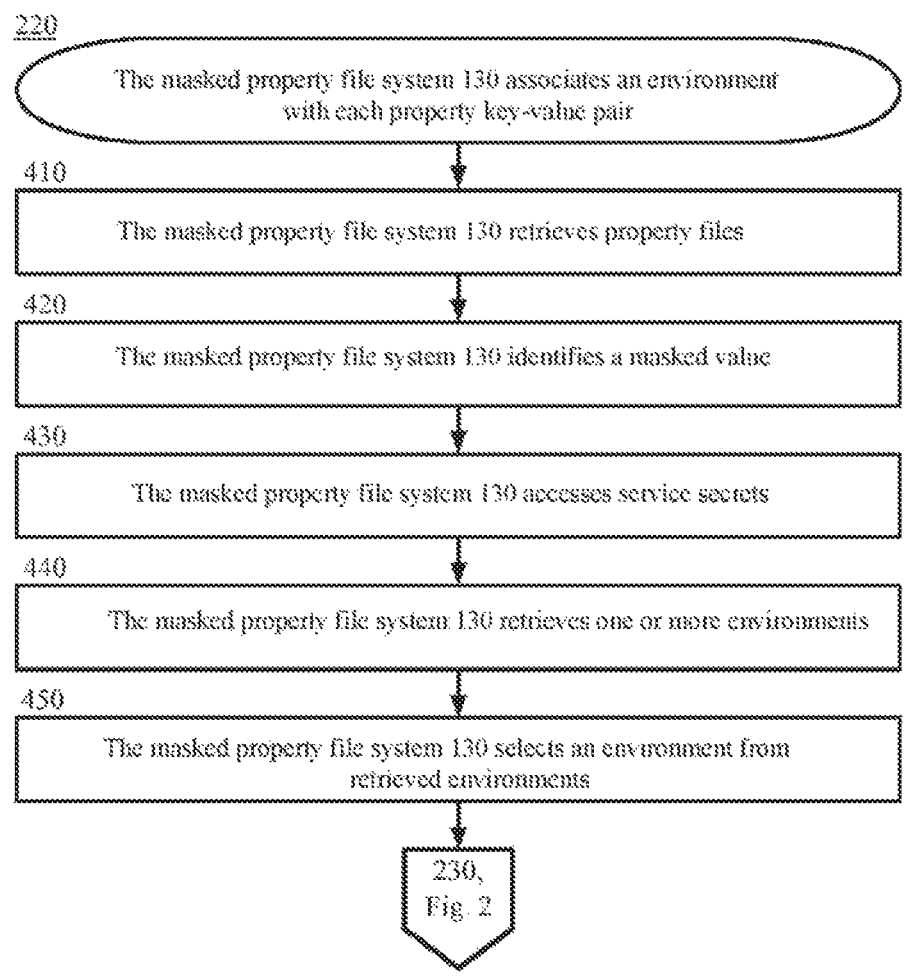
FIG. 4 is a block flow diagram depicting a method for identifying environments to associate with property key-value pairs based on property files associated with property key-value pairs and service secrets associated with environments, in accordance with certain example embodiments.

Returning to FIG. 2, in block 220, the masked property file system 130 associates an environment with each property key-value pair. FIG. 4 is a block diagram depicting a method 220 for identifying environments to associate with property key-value pairs based on property files associated with property key-value pairs and service secrets associated with environments, in accordance with certain example embodiments. The method 220 is described with reference to the components illustrated in FIG. 1. Runtime configuration properties, such as database passwords, are masked to restrict access from programmers during application development, and are automatically unmasked during execution of an application runnable in environments. A typical software development workflow include example environments such as Lab, QA, UAT, Staging, Integration, and Production.

Unmasking of a masked value comprises of a pair of a service secret and a property ciphertext secret, wherein the property ciphertext secret is associated with a property file comprises the masked value, and wherein a service secret is associated with a specific environment. Access to both a first service secret and a first property ciphertext secret are required to execute in a first environment an application runnable that requires access to a masked value in a first property file, wherein the first service secret is associated with the first environment, and the first property ciphertext secret is associated with the first property file.

In block 410, the masked property file system 130 retrieves property files associated with the retrieved property key-value pairs. In block 420, the masked property file system 130 identifies a masked value corresponding to each retrieved property key-value pair based on the property files. In an example embodiment, the masked property file system 130 identifies a masked values corresponding to a particular property key-value pair based on property files associated with the particular property key-value pair.

In an example embodiment, the masked property file system 130 identifies a masked value corresponding to a particular property key-value pair by comparing the property key-value pair to one or more other property key-value pairs for which the masked property file system 130 has identified a corresponding masked value. In this example embodiment, the masked property file system 130 may comprise a database of property key-value pairs and associated masked values. For example, the database of property key-value pairs and associated masked values may associate property key-value pairs with masked values. In an example, a property key-value pair of a programmer 101 comprises a query element of a database in a sales department, but the masked property file system 130 is unable to identify the property key-value pair as corresponding to the masked value "config.sales.database.password" based on property files associated with the property key-value pair.

In block 430, the masked property file system 130 accesses service secrets corresponding to environments. In an example embodiment, the masked property file system 130 comprises a masked value environment listing catalog. In this example embodiment, the masked value environment listing catalog comprises a list of masked values and one or more environments associated with each listed masked value. In an example embodiment, the masked property file system 130 obtains environments for masked values from one or more environments 120. For example, the masked property file system 130 comprises a web integration that periodically extracts information comprising environments from one or more property file services 129. In another example, one or more environments 120 periodically transmit, via the network 140, a list of environments associated one or more masked values to the masked property file system 120.

In block 440, the masked property file system 130 retrieves, for each property key-value pair, one or more environments associated with the identified masked value corresponding to the property key-value pair. In an example embodiment, for each property key-value pair, the masked property file system 130 identifies a masked value in the property key-value pair and retrieves one or more environments associated with the identified masked value in the masked value environment listing catalog. In another example embodiment, the masked property file system 130 identifies two or more masked values in a property key-value pair and retrieves one or more environments associated with each of the two or more identified masked values in the masked value environment listing catalog.

In block 450, the masked property file system 130 selects, for each property key-value pair, an environment from the one or more retrieved environments to associate with the property key-value pair.

In yet another example embodiment, the masked property file system 130 selects an environment from the one or more environments corresponding to a location of the environment 120 that is closest to a location of the user computing device 110 associated with the programmer 101 that submitted the property key. In this example embodiment, the masked property file system 130 requests the programmer 101 location from the user computing device 110 over the network 140. In this example embodiment, the programmer 101 enables location-based services on the user computing device 110 and the user computing device 110 transmits the current location of the user computing device 110 to the masked property file system 130. In this example embodiment, the masked property file system 130 compares the received location of the user computing device 110 against locations of environments 120 associated with one or more environments associated with a property key-value pair. In this example embodiment, the masked property file system 130 selects an environment from the one or more environments corresponding to the shortest distance between the location of the user computing device 110 and the location of the environment 120.

From block 450, the method 220 proceeds to block 230 in FIG. 2. Returning to FIG. 2, in block 230, the masked property file system 130 identifies, for each property key-value pair, an unmasking executable code associated with the selected environment corresponding to the property key-value pair. An example unmasking executable code comprises an executable code to a property file service 129 from which the selected environment originated. In an example embodiment, the unmasking executable code comprises an executable code that, when selected by the programmer 101 operating the user computing device 110, redirects the web browser 119 of the user computing device 110 to a property file service 129 that presents the environment to the programmer 101 and allows the programmer 101 to enter runnable and/or user information to unmasking the masked value.

In block 240, the masked property file system 130 generates, for each property key-value pair, a callback within the property key-value pair comprising the corresponding unmasking executable code. In an example embodiment, the callback comprises a text format. For example, the callback comprises a JSON structure of the selected environment associated with the property key-value pair rendered in an object of the property key-value pair. In an example embodiment, the masked property file system 130, when receiving an indication that a programmer 101 has selected a callback, redirects the web browser 119 of the user computing device 110 associated with the programmer 101 to the property file service 129 associated with the unmasking executable code. In block 250, the masked property file system 130 presents property key-value pairs comprising corresponding callbacks to the user computing device 110 to render in response to the programmer's 101 property key. For example, from the programmer's 101 perspective, the programmer 101 submitted a property key or other property key to the masked property file system 130 and the masked property file system 130 presents the property key-value pairs comprising the callbacks to the programmer 101 in response to receiving the property key.

In block 260, the programmer 101 selects a callback of a property key-value pair. For example, the programmer 101 actuates an object of the user interface 111 to select a callback of a property key-value pair. In an example embodiment, the user computing device 110 transmits, via the network 140 and to the masked property file system 130, an indication of the programmer's 101 selection of the callback of the property key-value pair. In an example embodiment, the masked property file system 130 receives, from the user computing device 110 via the network 140, the indication of the selection of the callback of the property key-value pair by the programmer 101. In an example embodiment, in response to receiving the indication of the programmer's 101 selection of the callback, the masked property file system 130 identifies the unmasking executable code associated with the callback.

In block 270, the user computing device web browser 119 is redirected to a property file service 129 associated with the unmasking executable code. In an example embodiment, the masked property file system 130 transmits instructions to the user computing device 110 comprising the unmasking executable code and instructing the web browser 119 of the user computing device 110 to redirect to a property file service associated with the unmasking executable code. In an example embodiment, the user computing device 110 receives the unmasking executable code and the instructions from the masked property file system 130 and instructs the web browser 119 to render the property file service 129 associated with the unmasking executable code. In an example embodiment, the user computing device web browser 119 communicates with the environment server 127 via the network 140 to render the property file service 129 on the user computing device 110. In another example embodiment, the user computing device web browser 119 is not redirected to the property file service 129. In yet another example embodiment, the application associated with the environment 120 and residing on the user computing device 110 executes on the user computing device 110 in response to the programmer 101 selecting the callback. In this example embodiment, the application associated with the environment 120 communicates with the environment 120 via the network 140.

In block 280, the programmer 101 completes an unmasking of the masked value associated with the selected property key-value pair. In an example embodiment, after the user computing device web browser 119 is redirected to the property file service 129, the programmer 101 completes a transaction with the environment 120 via the property file service 129 to unmask the masked value associated with the selected property key-value pair. In another example embodiment, after an application associated with the environment 120 executes on the user computing device 110 in response to the programmer 101 selecting the callback, the programmer 101 completes a transaction with the environment 120 via the application, which communicates with the environment 120 via the network 140.

In yet another example embodiment, the user computing device 110 web browser 119 is not redirected to the property file service 129 or does not communicate with the environment 120 via an application resident on the user computing device 110. In this example embodiment, a processing system associated with the masked property file system 130 processes a first unmasking transaction to receive runtime information from an account of the programmer 101 for providing the masked value associated with the selected property key-value pair. In this example embodiment, the processing system processes a second transaction to retrieve an environment 120 unmasking the masked value using a service secret from an account of the processing system.

Figure 5:
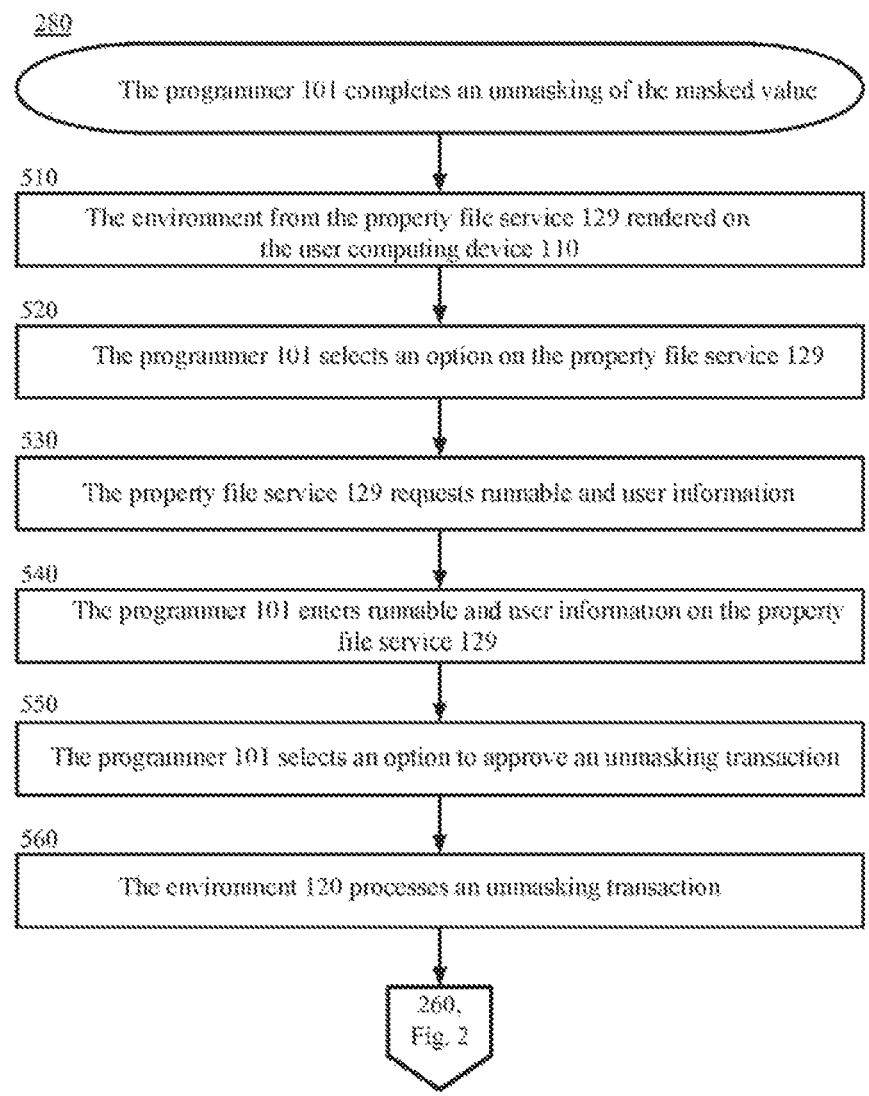
FIG. 5 is a block flow diagram depicting a method for completing an online unmasking of the masked value associated with selected property key-value pair, in accordance with certain example embodiments.

FIG. 5 is a block diagram depicting a method 280 for completing an unmasking of the masked value associated with selected property key-value pair, in accordance with certain example embodiments. The method 280 is described with reference to the components illustrated in FIG. 1. In these example embodiments, the programmer 101 completes a transaction via the property file service 129. In other example embodiments, one or more actions performed by the property file service 129 may also be performed by an application associated with the environment 120 and executing on the user computing device 110, wherein the application communicates with the environment 120 via the network 140.

In block 510, the environment from the property file service 129 is rendered on the user computing device 110. In an example embodiment, the property file service 129 associated with the unmasking executable code renders the masked value associated with the selected property key-value pair in a web application. In this example embodiment, the property file service 129 may also render an option to the programmer to initiate an unmasking of the masked value in rendered in the web application.

In block 520, the programmer 101 selects an option on the property file service 129 to unmask the masked value associated with the environment. For example, the programmer 101 actuates an object on the user interface 111 of the user computing device 110 to select the option rendered on the property file service 129 to unmasking the masked value associated with the environment. In an example embodiment, the user computing device web browser 119 communicates an indication of the programmer's 101 selection of the option of unmasking with the property file service 129.

In block 530, the property file service 129 requests runnable and user information from the programmer 101. For example, in response to receiving an indication of a programmer 101 selection of the option to unmask the masked value associated with the environment, the property file service 129 transmits a command to the user computing device 110 for runnable information and/or user information from the programmer 101. In an example embodiment, the user computing device 110 renders the request for runnable and/or user information to the programmer 101.

In block 540, the programmer 101 enters runnable and user information on the property file service 129. For example, the programmer 101 enters runnable information corresponding to one or more of a process id number, a web service address, or other applicable runnable information. In an example embodiment, the property file service 129 receives the runnable and user information entered by the programmer via the user computing device 110 over the network 140.

In block 550, the programmer 101 selects an option to approve an unmasking transaction to unmasking the masked value. In an example embodiment, the property file service 129, in response to receiving the programmer's 101 user information and runnable information, renders an option to approve an unmasking transaction to unmask the masked value. In an example embodiment, the programmer 101 actuates one or more objects on the user interface 111 to select the option to approve the unmasking transaction. For example, the programmer 101 clicks on an option reading "confirm" to approve the unmasking transaction.

In block 560, the environment 120 processes an unmasking transaction initiated by the programmer 101. In an example embodiment, the environment 120 communicates with a control processing system (not depicted) associated with the runnable information provided by the programmer 101 for use in the transaction. For example, the programmer 101 provided a web service endpoint to use in the transaction. In this example, the environment 120 communicates an unmasking authorization request to a control center associated with the web service endpoint via an authorization system associated with the endpoint. In this example, the control center approves the unmasking authorization request and transmits a notification of approval of the unmasking authorization request to the environment 120. In this example, the environment 120 transmits a receipt to the user computing device 110 confirming the success of the programmer's 101 transaction to unmask the masked value. In an example embodiment, an account of the programmer 101 is logged for the occurrence of the transaction and an account of the environment 120 is logged for the same transaction.

What is claimed:

1. A computer-implemented method to provide property key-value pairs comprising executable codes, comprising:
   receiving, by one or more computing devices and from a user computing device, a property key;
   retrieving, by the one or more computing devices, one or more property key-value pairs associated with one or more elements of the property key and property files associated with the one or more property key-value pairs;
   retrieving, by the one or more computing devices, service secrets corresponding to a plurality of environments;
   for each of the retrieved property key-value pairs:
      identifying, by the one or more computing devices, a masked value corresponding to the property key-value pair based on the property file;
      identifying, by the one or more computing devices, one or more environments of the plurality of environments correspond to the identified masked value;
      selecting, by the one or more computing devices, a particular environment of the one or more environments; and
      determining, by the one or more computing devices, an executable code associated with the particular environment, wherein the executable code directs the user computing device to a property file service offering unmasking of the masked value in response to a user selecting the executable code via the user computing device;
   generating, by the one or more computing devices, a callback comprising the executable code associated with the particular environment to be rendered with the retrieved property key-value pairs;
   transmitting, by the one or more computing devices and to the user computing device, the retrieved property key-value pairs comprising the respective callbacks for render on the user computing device.

2. The method of claim 1, further comprising:
   receiving, by the one or more computing devices and from the user computing device, an indication of a selection by the user of a callback corresponding to a particular property key-value pair; and
   transmitting, by the one or more computing devices and to the user computing device, a request for the web browser of the user computing device to redirect to the property file service corresponding to the executable code.

3. The method of claim 2, wherein the user unmasks the masked value by using the property file service via the user computing device.

4. The method of claim 1, further comprising:
   receiving, by the one or more computing devices and from the user computing device, an indication of a selection by the user of a callback corresponding to a particular property key-value pair; and
   transmitting, by the one or more computing devices and to the user computing device, a request for an application associated with the property file service resident on the user computing device to communicate with the property file service corresponding to the executable code.

5. The method of claim 1, further comprising:
   receiving, by the one or more computing devices and from the user computing device, an indication of a selection by the user of a callback corresponding to a particular property key-value pair;
   transmitting, by the one or more computing devices and to the property file service corresponding to the executable code, a request for a property plaintext secret associated with the masked value;
   receiving, by the one or more computing devices and from the property file service, the requested property ciphertext secret associated with the masked value;
   determining, by the one or more computing devices and based on the property ciphertext secret, a second plaintext secret for unmasking the masked value;
   transmitting, by the one or more computing devices and to the user computing device, a request for runnable information from the user, wherein the user enters or selects runnable information via the user computing device;
   receiving, by the one or more computing devices and from the user computing device, runnable information from the user:
   processing, by the one or more computing devices, a first transaction to unmask the masked value using the second plaintext secret, and
   processing, by the one or more computing devices, a second transaction to provide a runnable with the unmasked value using the runnable information from the user.

6. The method of claim 1, wherein the property file comprises contextual information associated with the property key-value pair as rendered on a web service discovery to which the property key-value pair pertains.

7. A system to provide property key-value pairs comprising executable codes, comprising:
   a storage device; and
   a processor communicatively coupled to the storage device, wherein the processor executes application code instructions that are stored in the storage device to cause the system to:
   receive a property key;
   retrieve one or more property key-value pairs associated with one or more elements of the property key and property files associated with the one or more properly key-value pairs;
   retrieve service secrets corresponding to a plurality of environments; for each of the retrieved property key-value pairs:
   identify a masked value corresponding to die property key-value pair based on the property file;

identify one or more environments of the plurality of environments corresponding to the identified masked value;
select a particular environment of the one or more environments;
determine an executable code associated with the particular environment, wherein the executable code directs a user computing device to a property file service offering the masked value in response to a user selecting the executable code via the user computing device;
generate a callback comprising the executable code associated with the particular environment to be rendered with the retrieved property key-value pairs; and
transmit, to the user computing device, the retrieved property key-value pairs comprising the respective callbacks for render on the user computing device.

8. The system of claim 7, wherein the processor is further configured to execute computer-readable program instructions stored in the storage medium to cause the system to:
receive, from the user computing device, an indication of a selection by the user of a callback corresponding to a particular property key-value pair;
transmit, to the property file service corresponding to the executable code, a request for a property plaintext secret associated with the masked value;
receive, from the property file service, the requested property ciphertext secret associated with the masked value;
determine, based on the property ciphertext secret, a second plaintext secret of the masked value;
transmit, to the user computing device, a request for runnable information from the user, wherein the user enters or selects runnable information via the user computing device;
receive, from the user computing device, runnable information of the user;
process a first transaction to unmask the masked value using the second plaintext secret; and
process a second transaction to provide a runnable with the unmasked value using the runnable information from the user.

9. The system of claim 7, wherein the processor is further configured to execute computer-readable program instructions stored in the storage medium to cause the system to:
receive, from the user computing device, an indication of a selection by the user of a callback corresponding to a particular property key-value pair; and
transmit, to the user computing device, a request for the web browser of the user computing device to redirect to the property file service corresponding to the executable code.

10. The system of claim 7, wherein the processor is further configured to execute computer-readable program instructions stored in the storage medium to cause the system to:
receive, from the user computing device, an indication of a selection by the user of a callback corresponding to a particular property key-value pair; and
transmit, to the user computing device, a request for an application associated with the property file service resident on the user computing device to communicate with the property file service corresponding to the executable code.

* * * * *